H. C. SCHROEDER.

SHEET ASSEMBLING MECHANISM FOR PRINTING PRESSES.

APPLICATION FILED MAY 21, 1913.

Reissued May 26, 1914.

13,737.

3 SHEETS—SHEET 1.

Witnesses:
L. B. Graham
W. A. Furner.

Inventor:
Hans C. Schroeder.
By Adams & Jackson.
Att'ys.

H. C. SCHROEDER.

SHEET ASSEMBLING MECHANISM FOR PRINTING PRESSES.

APPLICATION FILED MAY 21, 1913.

Reissued May 26, 1914.

13,737.

3 SHEETS—SHEET 2.

Witnesses:
L. B. Graham
W. A. Turner.

Inventor:
Hans C. Schroeder
By Adams & Jackson
Att'ys.

H. C. SCHROEDER.

SHEET ASSEMBLING MECHANISM FOR PRINTING PRESSES.

APPLICATION FILED MAY 21, 1913.

Reissued May 26, 1914.

13,737.

3 SHEETS—SHEET 3.

Witnesses:
L. B. Graham
W. A. Turner.

Inventor:
By Hans C. Schroeder
Adams & Jackson
Att'ys.

UNITED STATES PATENT OFFICE.

HANS C. SCHROEDER, OF CHICAGO, ILLINOIS, ASSIGNOR TO THE GOSS PRINTING PRESS COMPANY, OF CHICAGO, ILLINOIS, A CORPORATION OF ILLINOIS.

SHEET-ASSEMBLING MECHANISM FOR PRINTING-PRESSES.

13,737. Specification of Reissued Letters Patent. Reissued May 26, 1914.

Original No. 1,048,746, dated December 31, 1912, Serial No. 678,351. Application for reissue filed May 21, 1913. Serial No. 769,122.

*To all whom it may concern:*

Be it known that I, HANS C. SCHROEDER, a subject of the German Emperor, residing at Chicago, in the county of Cook and State of Illinois, have invented certain new and useful Improvements in Sheet-Assembling Mechanism for Printing-Presses, of which the following is a specification, reference being had to the accompanying drawings.

This invention relates to sheet assembling mechanism for printing presses and its object is to provide a new and improved form and arrangement of such sheet assembling mechanism.

One of the objects of my invention in particular is a new and improved arrangement of such mechanism by which the separate sheet feeding devices are placed within the main frame of the press instead of outside of the same, and whereby not only is floor space saved but a more convenient and accessible form of such delivery mechanism is provided.

Other objects of my invention are to provide a new and improved form of sheet assembling mechanism in which a number of webs are gathered together and cut into sheets forming the main body of the paper, in which insert sheets, after being fed to a suitable table, are folded centrally and thus folded are brought into association with the main sheets in position to be upon the inside of the folded product and in which cover sheets may be associated with the main sheets and insert sheets in such position as to be on the outside of the folded product.

Figure 1:
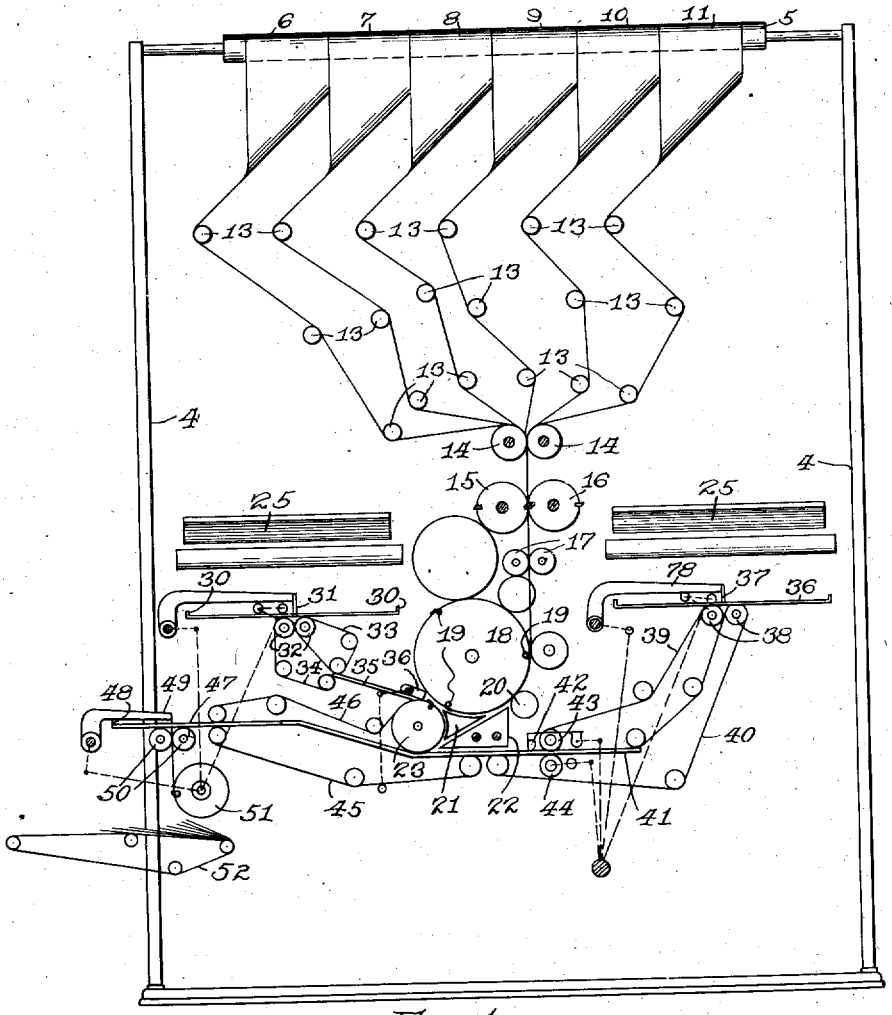
Figure 2:
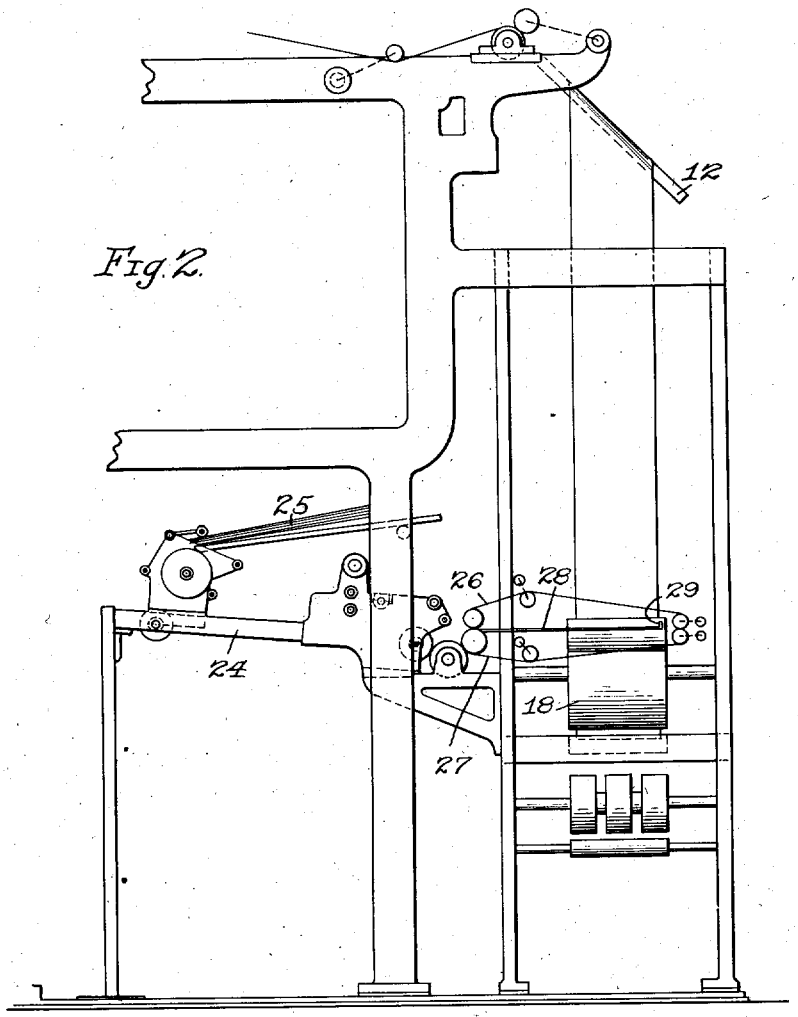
Figure 3:
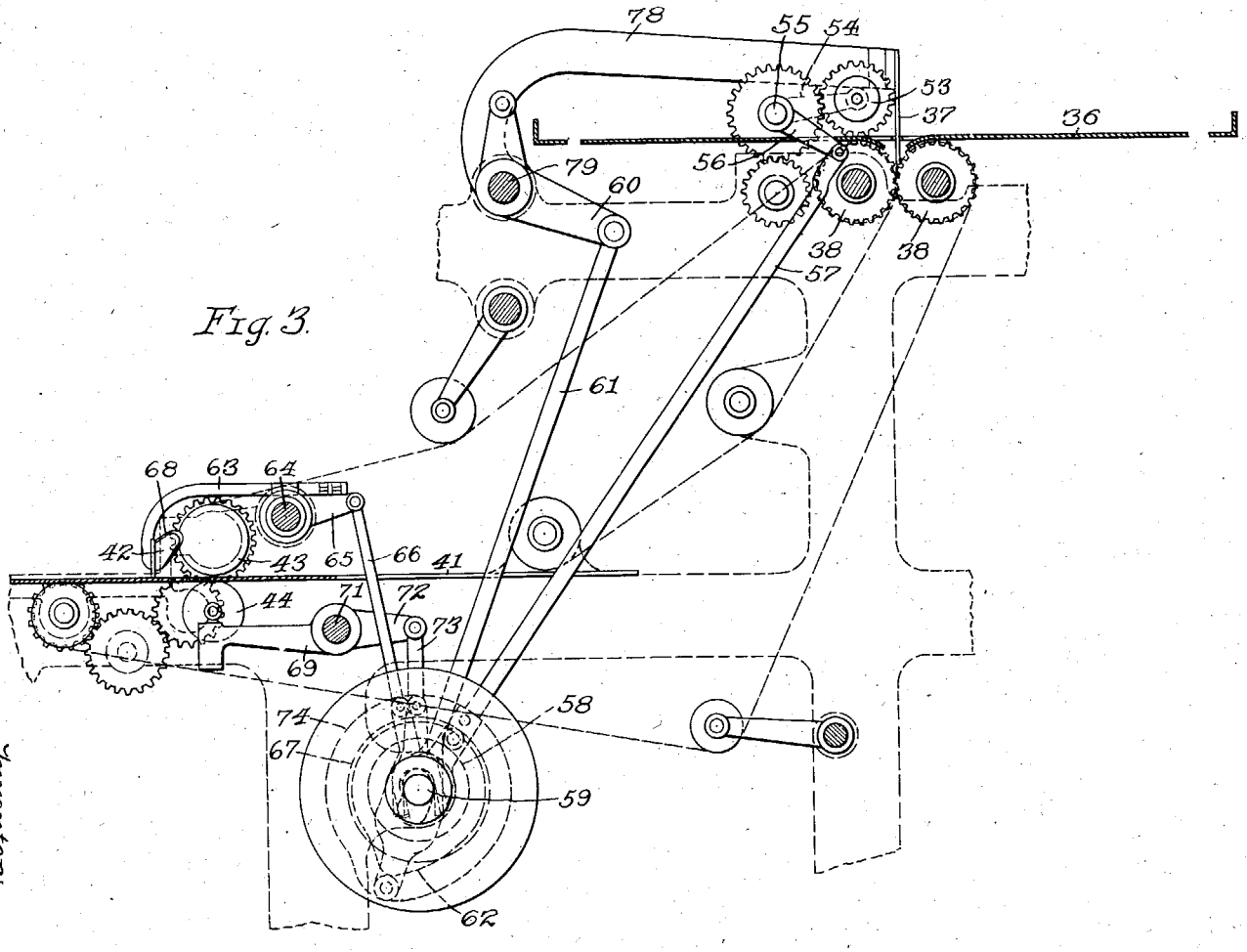

Referring to the drawings,—Figure 1 is a front elevation diagrammatically illustrating my invention; Fig. 2 is a side elevation; and Fig. 3 is an enlarged detail, being a side elevation of the sheet folding and forwarding mechanism of the cover sheets.

Referring to the several figures of the drawings, in which corresponding parts are indicated by like reference characters,—

4 indicates the main frame of the machine.

5 indicates the usual roller journaled in the main frame, over which the webs 6—7—8—9—10—11 are led. As shown in the drawings, there are six sections of the web. Of course, the number may be increased or diminished and it is immaterial whether they come from six separate webs or from one or more webs slit into sections in any well-known way. Passing over the guide-rollers the webs pass over angle-bars 12 of the well-known form and description by which they are deflected and passing over suitable guide rollers as 13 are brought together in registry and associated between registering rolls 14 in the well-known manner. Passing the registering rolls 14 in registry the webs pass between cutting cylinders 15—16 where they are severed transversely in the well-known manner and are led between suitable guide-rollers as 17 to a collecting cylinder 18. The sheets severed from the superposed webs are collected upon the collecting cylinder 18 in any well-known and approved manner forming of itself no part of my invention. When a sufficient number are collected the lead edge is released from the grippers 19, with which the collecting cylinder is provided, after the lead edge has passed roller 20 and the sheets pass between guide-blocks 21—22 downward and forward adjacent to gripper cylinder 23 to be associated with the insert sheets as hereinafter described.

Referring to Fig. 2, where it is best shown, 24 indicates a suitable sheet forwarding mechanism, preferably such as that of the well-known Cross type, which is adapted to forward the insert sheets 25, which have been previously printed, in the well-known manner. The sheet forwarding mechanism 24 is, as is shown in Fig. 2, located within the main frame 4 and directly behind a folding and forwarding mechanism hereinafter described. One of these forwarding mechanisms is placed upon each side of the machine behind the folding devices hereinafter described, although only one is shown in Fig. 2 of the drawings to avoid unduly complicating the drawings. The sheets are delivered by the sheet forwarding mechanism 24, one at a time, and in a direction parallel with the run of the main webs 6 to 11, inclusive, into tape paths 26—27 by which the sheets are fed one at a time forward upon a folding table 28 against a stop 29 between guiding ledges 30 (see Fig. 1). Actuated at suitable intervals by any well-known mechanism a folding blade 31 operates to tuck the central margin of the sheet fed upon table 28 between folding rollers 32 into tape paths 33—34 by which the sheets centrally folded are fed down upon a table 35 against the stop 36, which is adapted to be raised at suitable intervals by any well-known mechanism. At suitable intervals the gripper cylinder 23 engages the lead edge of the folded sheet and carries the same around cylinder 23 so as to bring the lead edge into register with the lead edge of the pile of sheets severed from the main webs and collected upon collecting cylinder 18 in the manner above described. 36 indicates a second table like the table 28 to which sheets are fed by a suitable feeder like that above described, and located, as has been described above, directly behind the table and within the framework of the press.

37 indicates a folding tucking blade, which, operated by mechanism, hereinafter described, at suitable intervals folds the sheet centrally in the direction of its run between folding rollers 38. By means of tape paths 39—40 the folded sheet is led to a table 41 and brought against a stop 42, which will be hereinafter more fully described.

43 indicates rollers above the table 41.

44 indicates a pressure roller adapted to co-act with roller 43 at suitable intervals and which is raised so as to co-act with roller 43 at suitable intervals in the manner hereinafter described. Whenever the rollers 43—44 are brought into operative relation and the stop 42 is removed at suitable intervals the sheets are fed into tape paths 45—46 and the parts are so timed that the lead edge of this cover sheet will be brought into registry with the lead edges of the main sheets and the insert sheets, brought together as above described, and below the main sheets. By means of these tape paths the associated insert sheets, main sheets and cover sheet are brought together upon a table 47 against a registering stop 48 from which they are folded by the usual folding blade as 49 operated in the well-known manner between folding rollers 50 to any suitable delivery mechanism as delivery cylinder 51 and tape paths 52. The cover sheets may be of only one-half width transversely of their run in which case, of course, they will not be folded. In this case they are fed upon the left hand side (see Fig. 1) of the table 36. The folding blade 37 in this case acts to push the side edge of the sheet between rollers 38, the sheet being forwarded into the bite of the rollers 38 by a movable pressure roller 53 (see Fig. 3) hereinafter described.

Referring to Fig. 3, 53 indicates a roller which is mounted upon arms 54 on a rock-shaft 55 and is adapted, when the shaft is rocked as hereinafter described, to press upon the surface of the sheet when only a single width sheet is used for the cover as last above described. 56 indicates an arm on rock-shaft 55 which, by means of an arm 57, is operated by a cam 58 on shaft 59. The cam 58 is so shaped as to move the arm 57 to rock the shaft 55 at suitable intervals to bring the roller 53 into contact with the paper and coöperate with the folding blade 37 as above described. Referring to the same drawing, the folding blade 37 is mounted upon an arm 78 on rock shaft 79, which is rocked by arm 60 and link 61 operated by a suitable cam as 62 on the shaft 59. The cam is so arranged that the knife will operate at suitable intervals to forward the sheet whether folded or not folded to stop 42. The stop 42 is mounted upon an arm 63 on a rock-shaft 64 journaled in any suitable way in a frame and provided with rock-arm 65 which is operated by arm 66 and cam 67 on the shaft 59. As is best shown in Fig. 3, the stop 42 is provided with a guide 68 which extends outward from the stop and bends downward and inward toward it so as to prevent the lead edge of the sheet from being carried upward in any way. The cam 67 is so arranged as to operate at suitable intervals to permit the sheet to be forwarded in time for its lead edge to come into registry with the main sheets and insert sheets as above described. The forwarding of the sheets at suitable intervals when the stop is raised is effected, as above stated, by rollers 43 and 44, of which the roller 43 is fixed and the roller 44 movable. As is best shown in Fig. 3, the shaft of the roller 44 is spring seated upon arm 69 on a rock-shaft 71. The rock-shaft 71 is operated by another arm 72 and link 73 and cam 74 on the shaft 59. The cam 74 is so shaped and timed as to rock the shaft 71 and bring rollers 44 into operative relation with rollers 43 at such intervals as to forward the cover sheet into the tape paths 45—46 and meet the main sheets and insert sheets with their lead edges substantially together. That is to say, when all the sheets, the insert sheets, the collected main sheets and the cover sheet are brought together at the lower side of delivery cylinder 23 into the bite of the tape paths 45 and 46 they are substantially in register and associated together. The registry is completed and the sheets brought into proper association for their final fold by being brought against the stop 48 as above described.

What I claim as my invention, and desire to secure by Letters Patent, is,—

1. A sheet collecting and delivery mechanism having, in combination, means for severing a web into sheets, a collecting cylinder adapted to collect said sheets and deliver them, a folding table located to one side of said collecting cylinder in substantially the same vertical plane therewith, sheet forwarding mechanism located behind said folding table and adapted to forward a sheet thereto, a folding knife adapted to fold said sheet in a line parallel with its travel from said sheet forwarding mechanism, means for feeding said sheet away from said folding table in a path substantially at right angles to its original path from said sheet forwarding mechanism and forwarding the said sheet to and associating the same with the collected sheets, and means for forwarding said sheets.

2. A sheet collecting and delivering machine, having in combination, means for severing a web into sheets, a collecting cylinder adapted to collect said sheets and deliver them, a folding table located to one side of said collecting cylinder in substantially the same vertical plane therewith, a sheet forwarding means located behind said folding table and adapted to forward a sheet thereto, a folding knife adapted to fold said sheet, means for bringing said sheet to and associating the same with the collected sheets, a second folding table located at the other side of said collecting cylinder, sheet forwarding means located behind said second table and adapted to forward a sheet thereto, a folding knife adapted to fold said sheets, means adapted to intermittently forward said last named sheets to and associate them with the said collected sheets upon the opposite side from said first named sheets, a registering stop, and means for forwarding all of said sheets to said registering stop.

3. In a sheet forwarding mechanism, in combination, a frame, means for associating a plurality of web sections into register, means for severing said webs into sheets, a collecting cylinder adapted to collect said associated sheets and deliver the same, a folding table located within said frame to one side of said collecting cylinder and upon the same vertical plane therewith, sheet forwarding mechanism located within said frame behind said folding table and adapted to forward sheets to said table, means for folding said sheets from said table in a line parallel with the line of their forwarding from said sheet forwarding mechanism, means for forwarding said sheets from said table in a path substantially at right angles to their original path, means for associating said sheet with said collected sheets, a registering stop, and means for forwarding said collected sheets and said added sheet to said registering stop.

4. In a sheet forwarding mechanism, in combination, a frame, means for associating a plurality of web sections into register, means for severing said webs into sheets, a collecting cylinder adapted to collect said superposed sheets and deliver the same, a folding table located within said frame to one side of said collecting cylinder and in the same vertical plane therewith, sheet forwarding mechanism located within said frame behind said folding table and adapted to forward sheets to said table, means for folding said sheets from said table and forwarding the same, means for associating said folded sheet with said collected sheets, a second table located within said frame upon the other side of said collecting cylinder and in substantially the same vertical plane therewith, sheet forwarding mechanism located within said frame behind said table and adapted to forward a sheet to said second table, means for folding said second sheet, means for intermittently delivering said second sheet to and associating the same with said collected sheets and said first named folded sheet, a registering stop, and means forwarding said collected sheets and said additional sheets against said registering stop.

5. A sheet forwarding and delivering machine having in combination, means for associating a plurality of webs, means for cutting the same into sheets, a collecting cylinder adapted to collect the said severed sheets, a table located to one side of said collecting cylinder and provided with a stop, a sheet forwarding mechanism located within said frame behind said table and adapted to forward a sheet to said table, a delivery cylinder in proximity to said collecting cylinder, means for forwarding the sheets from said table to said delivery cylinder, means for bringing together the sheets from said collecting cylinder and the sheet from said delivery cylinder, a registering stop, and means for forwarding the superposed sheets to said registering stop.

6. A sheet-assembling mechanism, comprising collecting means for collecting a plurality of sheets, folding means, means for conducting the sheets from said collecting means to said folding means, and a plurality of devices independent of the folding means for conducting sheets to and assembling them with said first-mentioned sheets, on the upper and under surfaces thereof, respectively, after they leave said collecting means and before they are folded.

7. A sheet-assembling mechanism, comprising a collecting cylinder for collecting a plurality of sheets, folding means, a registering stop, means for conducting the sheets along a path from said collecting cylinder unslit to said registering stop, and means independent of the folding means for feeding in a cover sheet without a longitudinal fold to the sheets from the collecting cylinder after the latter have left the collecting cylinder and while traveling along said path to the folder, said cover feeding means including a timing device for timing the entry of the cover sheet into said path.

8. A sheet-assembling mechanism, comprising a collecting cylinder for collecting a plurality of sheets, folding means, means for conducting the sheets from said collecting cylinder to the folding means, and means independent of the folding means for assembling a cover sheet and an insert sheet with the sheets from the collecting cylinder, and on the upper and under surfaces thereof, respectively, after they have left the collecting cylinder and before they are folded.

9. A sheet collecting and delivering machine including in combination means for cutting and collecting a plurality of sheets from a web, a registering stop, means for forwarding said collected sheets along a substantially horizontal pathway to said registering stop there to be operated upon by a subsequent mechanism, means for separating a single sheet from a pile of sheets and for directing it into said pathway at a point between said collecting means and registering stop and associating it with and on top of said collected web sheets, said last-mentioned means including a timing device in the path of said sheet after it has been separated from said pile for timing its admission into said pathway.

10. A sheet collecting and delivering machine including in combination means for cutting and collecting a plurality of sheets from a web, a registering stop, means for forwarding said collected sheets along a pathway to said registering stop there to be operated upon by a subsequent mechanism, means for separating a single sheet from a pile of sheets and associating it with said web sheets upon one side thereof, means for separating a second single sheet from a pile of sheets and directing it into said pathway at a point between said collecting means and registering stop and associating it with said web sheets on the opposite side from said first-mentioned single sheet, and means for timing the admission of said second single sheet into said pathway.

11. A sheet collecting and delivering machine including in combination means for cutting and collecting a plurality of sheets from a web, a registering stop, means for forwarding said collected sheets along a pathway to said registering stop there to be operated upon by a subsequent mechanism, means for separating a single sheet from a pile of sheets and feeding it into said pathway at a point between said collecting means and said registering stop and associating it with said web sheets upon one side thereof, means for separating a second single sheet from a pile of sheets and directing it into said pathway at a point between said collecting means and registering stop and associating it with said web sheets on the opposite side from said first mentioned single sheet, and means for timing the admission of said second single sheet into said pathway.

12. A sheet collecting and delivering machine including in combination means for cutting and collecting a plurality of sheets from a web, and means for separating a single sheet from a pile of sheets and forwarding it in either a folded or an unfolded condition into association with the collected web sheets after the latter sheets have left the collecting means, said means including timing devices for said sheet.

13. A sheet collecting and delivering machine including in combination means for cutting and collecting a plurality of sheets from a web, and means for separating a single sheet from a pile of sheets and forwarding it in either a folded or an unfolded condition into association with the collected web sheets after the latter sheets have left the collecting means, said means including timing devices for said sheet, and means for separating a single sheet from a pile of sheets and forwarding it in either a folded or an unfolded condition into association with the other side of said collected web sheets after the latter sheets have left the collecting means, said means including timing devices for said sheet.

14. A sheet collecting and delivering machine including in combination means for cutting and collecting a plurality of sheets from a web, means for separating a sheet from a pile of sheets, and means for forwarding it in either a folded or unfolded condition and associating it with the web sheets after the latter sheets have left the collecting means.

15. A sheet associating and folding machine including in combination means for collecting a plurality of sheets, folding means, a plurality of devices for associating sheets with said collected sheets upon both sides thereof, and means for registering all said sheets together after they are associated and prior to their being folded.

16. A sheet associating and folding machine including in combination means for collecting a plurality of sheets, folding means, a plurality of devices for associating sheets with said collected sheets upon both sides thereof, and means for stopping and registering all said sheets together after they are associated and prior to their being folded.

17. A sheet collecting and delivering machine including in combination means for cutting and collecting a plurality of sheets from a web, a registering stop, means for forwarding said collected sheets to said registering stop there to be operated upon by a subsequent mechanism, means for separating a single sheet from a pile of sheets and for directing it into said pathway at a point between said collecting means and registering stop and associating it with said collected web sheets, said last-mentioned means including a timing device in the path of said sheet after it has been separated from said pile for timing its admission into said pathway.

18. A sheet-assembling mechanism, comprising collecting means for collecting a plurality of sheets, stationary folding means, means for conducting the sheets from said collecting means to said folding means, and a plurality of devices independent of the folding means for conducting sheets to and assembling them with said first-mentioned sheets, on the upper and under surfaces thereof, respectively, after they leave said collecting means and before they are folded.

19. A sheet-assembling mechanism, comprising a collecting cylinder for collecting a plurality of sheets, folding means, means for conducting the sheets from said collecting cylinder to the folding means, means independent of the folding means for assembling a cover sheet and an insert sheet with the sheets from the collecting cylinder, and on the under and upper surfaces thereof, respectively, after they have left the collecting cylinder and before they are folded, and means for registering all said sheets together after they are assembled and prior to folding.

20. A sheet-assembling mechanism, comprising a collecting cylinder for collecting a plurality of sheets, folding means, means for conducting the sheets from said collecting cylinder to the folding means, means independent of the folding means for assembling a cover sheet and an insert sheet with the sheets from the collecting cylinder, and on the under and upper surfaces thereof, respectively, after they have left the collecting cylinder and before they are folded, and means for stopping and registering all said sheets together after they are assembled and prior to folding.

HANS C. SCHROEDER.

Witnesses:
JOHN L. JACKSON,
W. H. DE BUSK.